United States Patent [19]

Tada et al.

[11] 4,334,123
[45] Jun. 8, 1982

[54] INTERNAL COOLING TYPE SUPERCONDUCTOR

[75] Inventors: Naofumi Tada, Hitachi; Hiroshi Kimura, Tokyo; Hisanao Ogata, Shimoinayoshi, all of Japan

[73] Assignee: Hitachi, Ltd., Tokyo, Japan

[21] Appl. No.: 206,728

[22] Filed: Nov. 14, 1980

[30] Foreign Application Priority Data

Nov. 16, 1979 [JP] Japan .................. 54-147790

[51] Int. Cl.³ .......................................... H01B 12/00
[52] U.S. Cl. ............................... 174/15 S; 174/126 S; 174/128 S; 29/599
[58] Field of Search ............. 174/15 R, 15 CA, 15 S, 174/15 C, 15 B, 126 R, 126 S, 128 S, 128 BL, 133 B, 130; 29/599; 335/216; 165/179

[56] References Cited

U.S. PATENT DOCUMENTS

| | | | |
|---|---|---|---|
| 3,472,944 | 10/1969 | Morton et al. | 174/15 S |
| 4,038,492 | 7/1977 | Kullmann | 174/15 S |
| 4,039,740 | 8/1977 | Iwata | 174/15 S |

FOREIGN PATENT DOCUMENTS

| | | |
|---|---|---|
| 1440838 | 3/1969 | Fed. Rep. of Germany ... 174/133 B |
| 2602734 | 6/1977 | Fed. Rep. of Germany .... 174/15 S |
| 2113597 | 3/1978 | Fed. Rep. of Germany .... 174/15 S |
| 1503956 | 10/1967 | France ............................. 174/15 S |
| 54-57994 | 5/1979 | Japan . |
| 53-17326 | 8/1979 | Japan ............................... 174/15 S |

OTHER PUBLICATIONS

*IEEE Transactions on Magnetics*, vol. Mag.-15, No. 1, Jan. 1979, "Development in Nb₃Sn Forced Flow Conductors From Large Magnets", P. A. Sanger et al.

Primary Examiner—Volodymyr Y. Mayewsky
Attorney, Agent, or Firm—Thomas E. Beall, Jr.

[57] ABSTRACT

A superconductor has a coolant passage in the internal portion to cool itself by flowing a coolant in the coolant passage. The coolant passage is formed in the stabilizing material portion in such a manner that the inner wall of the coolant passage is wave-shaped, proportion of the cross-sectional area of the coolant passage occupied in the cross-section of the superconductor is 4–22 percent, and a ratio of the circumferential length to the cross-sectional area of the coolant passage is greater 25 $(cm^{-1})$.

9 Claims, 4 Drawing Figures

INTERNAL COOLING TYPE SUPERCONDUCTOR

BACKGROUND OF THE INVENTION

This invention relates to a superconductor, and more particularly to an internal cooling type superconductor which is suitable for use in large-sized, high-magnetic field superconducting coils.

For superconducting coils large in size and capable of generating high magnetic fields, the use of an internal cooling type superconductor has been studied in view of, principally, problems on the cooling of the coils. Whether it is an immersion cooling type superconductor or the internal cooling type superconductor, a large-size superconductor which can conduct a high current in a high magnetic field is required to have a conductor strength which is enough to withstand high electromagnetic stresses and a stability owing to which even when the superconductor has been locally brought into a normal conducting state by a thermal or mechanical disturbance, it can return to a superconducting state again upon removing the disturbance. With regard to a coolant passage within the superconductor, regarding particularly the structure of the coolant passage, various conductor structures as shown in IEEE TRANSACTIONS ON MAGNETICS VOL. MAG-15, No. 1, JANUARY 1979 Pages 789~791, Japanese Laid-open patent application No. 54-57994 (1979), etc. have heretofore been proposed. However, they have demerits with merits and are unsatisfactory as the conductors for use in the large-sized high-field superconducting coils.

In FIG. 1 of the former document, there is shown a superconductor in which a large number of superconducting Nb$_3$Sn strands are formed into a cable and wrapped in a stainless steel jacket. The cooling is provided by forcing supercritical helium at 4 K through the interstices of the cable. The superconductor has the advantage that both the section of the coolant passage and the circumferential length of the passage are great, but has the disadvantages that the section of the divided coolant passage is non-uniform, so an elongated conductor has the possibility that the coolant passage will be locally closed up, and that the composite superconducting wire is moved by an electromagnetic force; the resultant heat generation renders the superconductor unstable.

In the latter document, for example, in its FIG. 6, there is disclosed a superconductor in which a pair of plates each including Nb$_3$Sn composite superconducting material are arranged in parallel with a spacing there between, and in the spacing a waved plate is disposed whereby a plurality of coolant passages are defined. By this cooling construction, it does not seem that a high stability can be obtained, which will become apparent from the explanation of the invention.

SUMMARY OF THE INVENTION

An object of the invention is to provide an internal cooling type superconductor, which is cooled effectively and has high stability.

Another object of the invention is to provide a compact internal cooling type superconductor which is high in stability, simple in construction, and suitable for large-size high magnetic field superconducting coils.

This invention is based on the facts found out by making a systematic study on the stability of internal cooling type superconductors, and is that a ratio between the total circumferential length of a coolant passage wall in contact with a coolant and the total sectional area of the coolant passage is greater than 25 (centimeter$^{-1}$) and that the total sectional area of the coolant passage is greater than 4 percent, preferably 4–22 percent, of the total sectional area of a superconductor. When the sectional area of the coolant passage is made large, it becomes difficult with a single passage to increase the ratio between the total circumferential length of the coolant pipe wall in contact with the coolant and the total sectional area of the coolant passage. The coolant passage therefore needs to be divided into at least two parallel passages.

This invention is based on the result of study as follows. The stability of the internal cooling type superconductor can be judged from whether or not a stabilization parameter $\alpha$ expressed by:

$$\alpha = \frac{\left(\frac{\gamma}{A}\right) I^2}{P h (T_n - T_B)} \tag{1}$$

is smaller than 0.8. Here, $\gamma$ indicates the electric resistivity (ohm-centimeter) of a stabilizer material, I the conduction current (ampere) of the superconductor, A the sectional area (square centimeter) of the stabilizer material, P the passage circumference (centimeter), h the heat transfer rate (watt/square centimeter·degree), $T_n$ the temperature (degree) of a paraconductor, and $T_B$ the temperature (degree) of the coolant. Supposing now that the heating condition of the superconductor (the numerator of Expression (1)), the type of the superconductor and the coolant condition are fixed, $\alpha \propto 1/P \cdot h$ holds, and the stabilized condition can be achieved by increasing P·h. Regarding the heat transfer rate h, in case of using supercritical helium as the coolant, there is the relationship of $h \propto 1/S_F$ (where $S_F$ denotes the sectional area of the coolant passage), and it is desirable that the sectional area of the coolant passage is small and that the circumferential length is great.

On the other hand, in case of the internal cooling type superconductor in which the coolant is forced to flow, the pressure loss of the coolant becomes a problem. Now, the pressure loss per unit length of the superconductor has the relationship:

$$\Delta/L \propto P^{1.25}/S_F^3$$

Here, $\Delta P$ denotes the pressure difference, and L the length of the conductor. Accordingly, when the sectional area of the coolant passage is made small, the pressure loss of the coolant becomes heavy, and the coolant passage length must be shortened. After all, the above study results in that the sectional area of the coolant passage may be made the minimum value permissible by the coolant passage length and that the circumferential length of the passage may be increased with the section to the utmost. For the increase of the circumferential length of the passage, it is the most effective to increase the circumferential length of the coolant passage wall in contact with the coolant.

In case of considering a large-sized high-field superconducting coil, the conduction current of the superconductor thereof is several tens kiloamperes, and it becomes a conductor construction which includes, not only a composite superconducting wire capable of conducting such current, but also a stabilizer material, a reinforcement member etc. Accordingly, although the proportion of the sectional area of the coolant passage occupied in the total section of the superconductor can vary depending upon the aforecited conditions, it is necessary that the ratio between the total circumferential length of the coolant passage wall in contact with the coolant and the total sectional area of the coolant passage is made greater than a certain value or 25 (centimeter$^{-1}$). Because when the ratio is below this value, the stabilization of the large-sized high-field superconducting coil becomes very difficult. The upper limit of the ratio between the total circumferential length of the coolant passage wall in contact with the coolant and the total sectional area of the coolant passage is naturally determined by the conductor fabricating technique and the coolant passage length, and is not specifically set here. As for the ratio between the sectional area of the coolant passage and the sectional area of the superconductor, 4 percent is the lower limit value viewed from the coolant passage length of the large-sized high-field superconducting coil. When the ratio is made greater than 22 percent, the section of the conductor must be made large, which results in lowering the current density of the coil.

DESCRIPTION OF THE PREFERRED EMBODIMENTS

Figure 1:
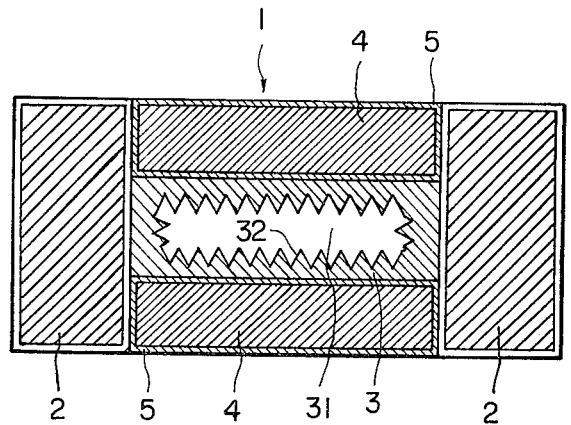
FIG. 1 is a sectional view of an embodiment of an internal cooling type superconductor according to the invention.

Referring to FIG. 1, an embodiment of a superconductor according to the invention will be described hereinafter in detail.

FIG. 1 shows a superconductor designed and fabricated. The dimensions of the cross section of the superconductor are 46 mm in width and 21 mm in thickness, and the critical current of the superconductor is 40 kA at a magnetic field of 12 T and a temperature of 5 K (K being the absolute temperature).

In FIG. 1, the superconductor 1 comprises a pair of niobium-tin ($Nb_3Sn$) composite superconducting wires 2 covered with stabilizing material such as copper, aluminum, etc., a stabilizer 3 and a pair of reinforcement members 4. The stabilizer 3 which is made of copper, aluminum or the like has a coolant passage 31 in the central portion of the cross section. The coolant passage 31 is wave-shaped in the side wall 32 and provided with a plurality of fins 2 mm deep at angles of 30 degrees. The reinforcement member 4 is made of stainless steel covered with a heat conductive material 5 such as copper or the like. The pair of the reinforcement members 4 are joined to the stabilizer 3 by silver brazing or electron beam welding so that high heat conductivity can be kept. The combined stabilizer and reinforcement members are joined to the pair of composite superconducting wires 2 by silver brazing, electron beam welding, or the like, so that very high heat conductivity can be kept. The proportion of the coolant passage sectional area to the whole cross sectional area of the superconductor 1 is 8.3%, and the ratio between the circumferential length of the coolant passage wall in contact with a coolant and the sectional area of the coolant passage is 26.4 (cm$^{-1}$). Subsequently, the stability is studied in the case where supercritical helium at a temperature of 5 K and under a pressure of 8 atm. is caused to flow through the coolant passage of the present superconductor at a flow rate of 5 gr./sec. and where a coil current of 20 kA is caused to flow through a paraconducting portion. As a result, the stabilization parameter $\alpha$ stated before became 0.75, and it is known that the superconductor is stabilized. When the pressure loss of the coolant passage is subsequently evaluated, it is 2.6 atm. at a passage length of 1 km. The supercritical state is satisfactorily held even at the outlet part of the passage, and a sufficiently feasible value is provided for the passage length of a large-sized superconducting coil. It is also revealed that the current density of the whole conductor including the coolant passage was 41.4 A/mm$^2$ at a magnetic field of 12 T and can be high as the superconductor of this sort.

Another embodiment of the invention will be described hereinafter, referring to FIG. 2.

A superconductor in which a coolant passage has a large number of divided parallel passages is designed and fabricated. The cross-sectional dimensions and specifications of the superconductor 1 A are the same as the above embodiment.

Figure 2:
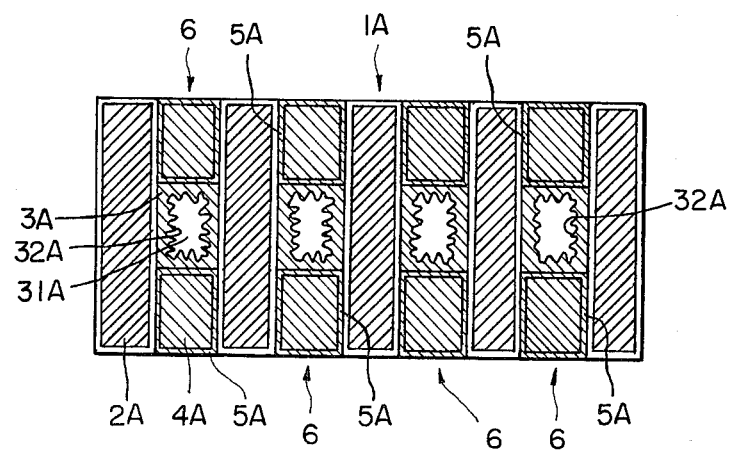
FIG. 2 is a sectional view of another embodiment of an internal cooling type superconductor according to the invention.

In FIG. 2, the superconductor 1 A comprises a plurality of $Nb_3Tn$ composite superconducting wires 2 A each covered with stabilizer material, a plurality of stabilizers 3 A each having a coolant passage 31 A, and a plurality of reinforcement members 4 A covered with heat-conductive material 5 A. The stabilizer 3 A and a pair of the reinforcement members 4 A with heat-conductive material 5 A disposed on both the opposite sides are joined by silver-brazing, electron beam welding, or the like to form an assembly 6. The assembly 6 is sandwiched by a pair of $Nb_3Sn$ composite superconducting wires 2 A and joined by the same joining means as above-mentioned.

Since the superconductor 1 A is divided into several pieces so that the coolant passage is divided into four, it is easy to make the circumferential length of the coolant passage wall 32 A in contact with the coolant great in comparison with the section of the coolant passage 31 A. The inner surface of the passage wall 32 A is provided with uneven parts having a radius of 0.5 mm. As a result, the proportion of the sectional area of the coolant passage 31 A occupied in the total section of the conductor 1 A became 6.2%, and the ratio between the total circumferential length of the coolant passage wall 32 A in contact with the coolant and the sectional area of the coolant passage 31 A became 33.5 (cm$^{-1}$). Next, the stability of the superconductor 1 A is studied under the same conditions as in the above embodiment. As a result, the stabilization parameter $\alpha$ becomes 0.57, and the superconductor 1 A is found to be more stable than the superconductor 1 previously mentioned. On the other hand, the pressure loss of the coolant passage 31 A became 2.9 atm. at a passage length of 500 m. The supercritical state is satisfactorily held even at the outlet part of the passage, and a sufficiently feasible value is provided for the passage length of a large-sized superconducting coil. It is also revealed that when the stabilizing conditions are made the same as in the first mentioned embodiment, the current density of the whole superconductor 1 A including the coolant passages 31 A is 46.6 A/mm$^2$ at a magnetic field of 12 T and is rendered higher than in the superconductor 1.

Figure 3:
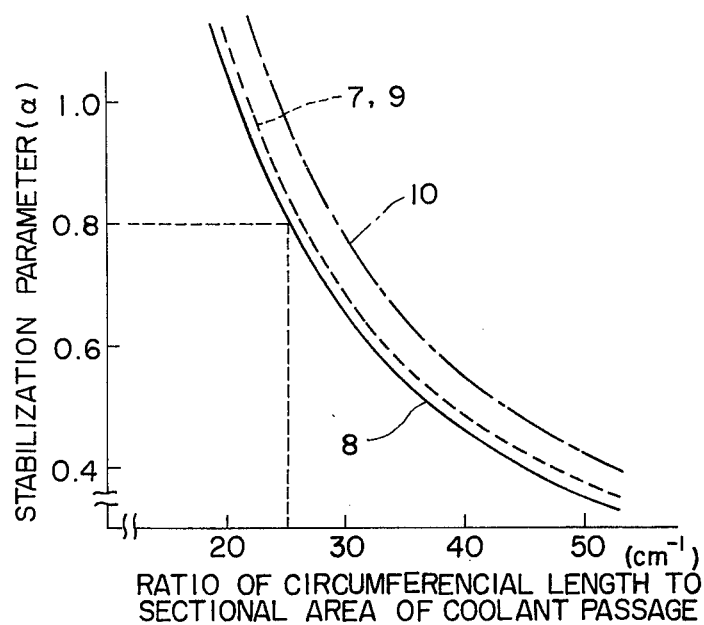
FIG. 3 is a graph for explaining relations between stabilization parameter ($\alpha$) and ratios of the circumferential length of a cooling passage to the sectional area of the cooling passage on superconductors with various values of the proportions of the cooling passage sectional area to the sectional area of a superconductor.
Figure 4:
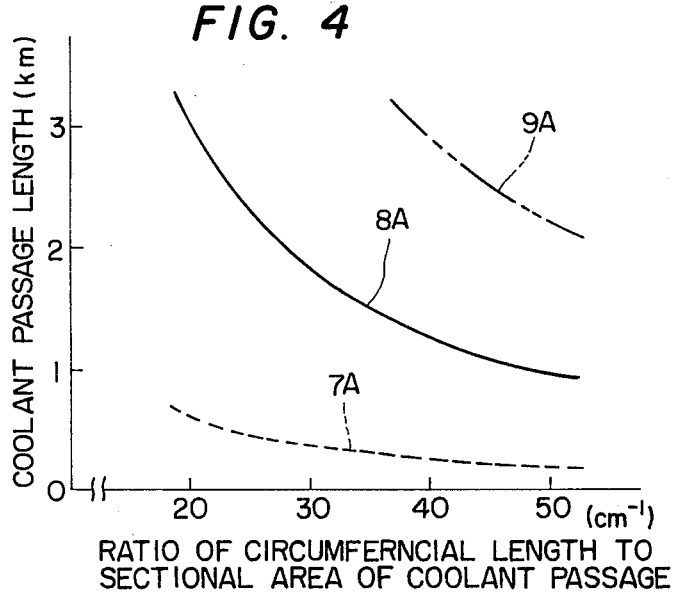
FIG. 4 is a graph for explaining relations between coolant passage length and ratios of the circumferential length of a cooling passage to the sectional area of the cooling passage on superconductors with various values of the proportions of the cooling passage sectional areas to the sectional area of the conductors.

Subsequently, regarding a niobium-tin (Nb$_3$Sn) superconductor which has the same cross-sectional dimensions as in the above two embodiments, the sectional area of the coolant passage and the circumferential length of the coolant passage wall in contact with the coolant, and the stability of the superconductor and the pressure loss of the coolant passage are studied. The construction of the present superconductor is such that the sectional areas of the niobium-tin (Nb$_3$Sn) composite superconducting wires and the reinforcement members are held constant and that the increase or decrease of the sectional area of the coolant passage is adjusted by the increase or decrease of the sectional area of the stabilizer material. FIG. 3 shows the stabilization parameters $\alpha$ of respective superconductors obtained under the same conditions as in the above two embodiments. When the ratio (the axis of abscissas) between the circumferential length of the coolant passage wall in contact with the coolant and the sectional area of the coolant passage increases, the stabilization parameter $\alpha$ (the axis of ordinates) become smaller in all the cases, that is, in cases where the ratios of the sectional area of the coolant passage occupied to the total section of the superconductor are 4%, 10%, 16% and 22% expressed by curves 7, 8, 9 and 10, respectively, so that the superconductors became more stable. However, whether the ratio of the sectional area of the coolant passage occupied in the total section of the superconductor is too small or too large, the stability worsened. On the other hand, as shown in FIG. 4 wherein curves 7 A, 8 A and 9 A are of the passage section proportions 9%, 10%, 16% respectively, the passage length (the axis of ordinates) at the time when the pressure loss of each superconductor is 4 atm. becomes extremely short if the ratio of the sectional area of the coolant passage occupied in the total section of the superconductor is smaller than 4%, and it is found that such coolant passage is complicated and unsuitable for the cooling system of the large-sized superconducting coil. In the present example, the cross-sectional dimensions of the superconductors are held the same. However, when the stabilization parameters $\alpha$ are made the same, the cross-sectional dimensions of a superconductor become smaller as the ratio (the axis of abscissas) between the circumferential length of the coolant passage wall in contact with the coolant and the sectional area of the coolant passage is increased, and a superconducting coil can have its current density rendered higher to that extent.

The above examples have been explained supposing that the cross-sectional dimensions of the superconductors, the material of the composite superconducting wire, the cross-sectional area of the reinforcement member, the specifications of the superconductor, the coolant condition, etc. are fixed. However, even when these numerical values and specifications differ as large-sized high-field superconductors, the effects mentioned in the embodiments are not essentially spoilt. Although the superconducting wires or conductors have been supposed Nb$_3$Sn for the sake of convenience of the explanation, it is a matter of course that the invention holds for other superconducting materials such as vanadium-gallium and niobium-titanium.

According to this invention, the structure of an internal cooling type superconductor is simple, and the ratio between the whole circumferential length of a coolant passage wall in contact with a coolant and the whole sectional area of the coolant passage can be made great, so that a large-sized superconducting coil can be fabricated which exhibits a good cooling uniformity, which has a high current density and in which the length of the coolant passage is great. This can make small the dimensions of an internal cooling type large-sized high-field superconducting coil and moreover simplifies a cooling system including the connection of the coolant passage, etc., and the economical effect thereof is great.

What is claimed is:

1. An internal cooling type superconductor having at least one wire of superconductive material throughout its length, a stabilizer joined to the superconductive material, a coolant passage formed in the stabilizer and extending in the length direction of said superconductor forming means to pass a coolant fluid and cool said superconductor and helium within said passage, the improvement being in that a ratio of a total circumferential length of said coolant passage contacting with supercritical helium as a coolant to a total sectional area of said coolant passage is greater than 25 (cm$^{-1}$), and that the total sectional area of said coolant passage is at least 4 percent of the total sectional area of said superconductor.

2. The internal cooling type superconductor as defined in claim 1, wherein said total sectional area of said coolant passage is 4–22 percent of the total sectional area of said superconductor.

3. The internal cooling type superconductor as defined in claim 2, wherein said coolant and fluid separated passages comprises at least two parallel and fluid separated passages.

4. An internal cooling type superconductor comprising:
    at least two composite superconducting wires of superconductive material arranged parallely with a distance therebetween;
    at least a stabilizer disposed between and joined to said composite superconducting wires; and
    coolant passage means defined by said stabilizer in the central portion of said stabilizer for passing a supercritical coolant to cool said superconductor and having wave-shaped side wall when seen in cross-section transverse to the wires, the ratio of the circumferential length of the side wall to contact the coolant to the sectional area of said coolant passage means being greater than 25 (cm$^{-1}$) as measure in said cross-section, and the sectional area of said coolant passage means being 4–22% of the total area in said cross-section of said superconductor.

5. An internal cooling type superconductor comprising:
    at least two composite superconducting wires of superconductive material arranged parallely with a distance therebetween;
    at least a stabilizer disposed between and joined to said composite superconducting wires;

coolant passage means defined by said stabilizer in the central portion of said stabilizer for passing a coolant fluid to cool said superconductor and having wave-shaped side wall when seen in cross-section transverse to the wires, the ratio of the circumferential length of the side wall to contact the coolant to the sectional area of said coolant passage means being greater than 25 ($cm^{-1}$) as measure in said cross-section, and the sectional area of said coolant passage means being 4–22% of the total area in said cross-section of said superconductor; and a pair of reinforcement members each disposed between said composite superconducting wires and joined to said stabilizer and said composite superconducting wires.

6. The internal cooling type superconductor, as defined in claim 5, wherein said wave-shaped side wall of said coolant passage means is provided with a plurality of fins with on angle of 60° at the tops.

7. The internal cooling type superconductor as defined in claim 5, wherein there are more than two of said composite superconducting wires, and each of a plurality of said stabilizers with the reinforcement members is disposed between adjacent pairs of said composite superconducting wires.

8. The internal cooling type superconductor as defined in claim 5, wherein each of said composite superconducting wires and said reinforcement members has a right angle parallelogram shape as seen in said cross-section, and adjacent sides that are bonded throughout their adjacent extent to each other.

9. The internal cooling type superconductor as defined in claim 7, wherein each of said composite superconducting wires and said reinforcement members has a right angle parallelogram shape as seen in said cross-section, and adjacent sides that are bonded throughout their adjacent extent to each other.

* * * * *